E. YIAKAS.
EGG BEATER.
APPLICATION FILED JULY 20, 1915.
1,164,443.
Patented Dec. 14, 1915.
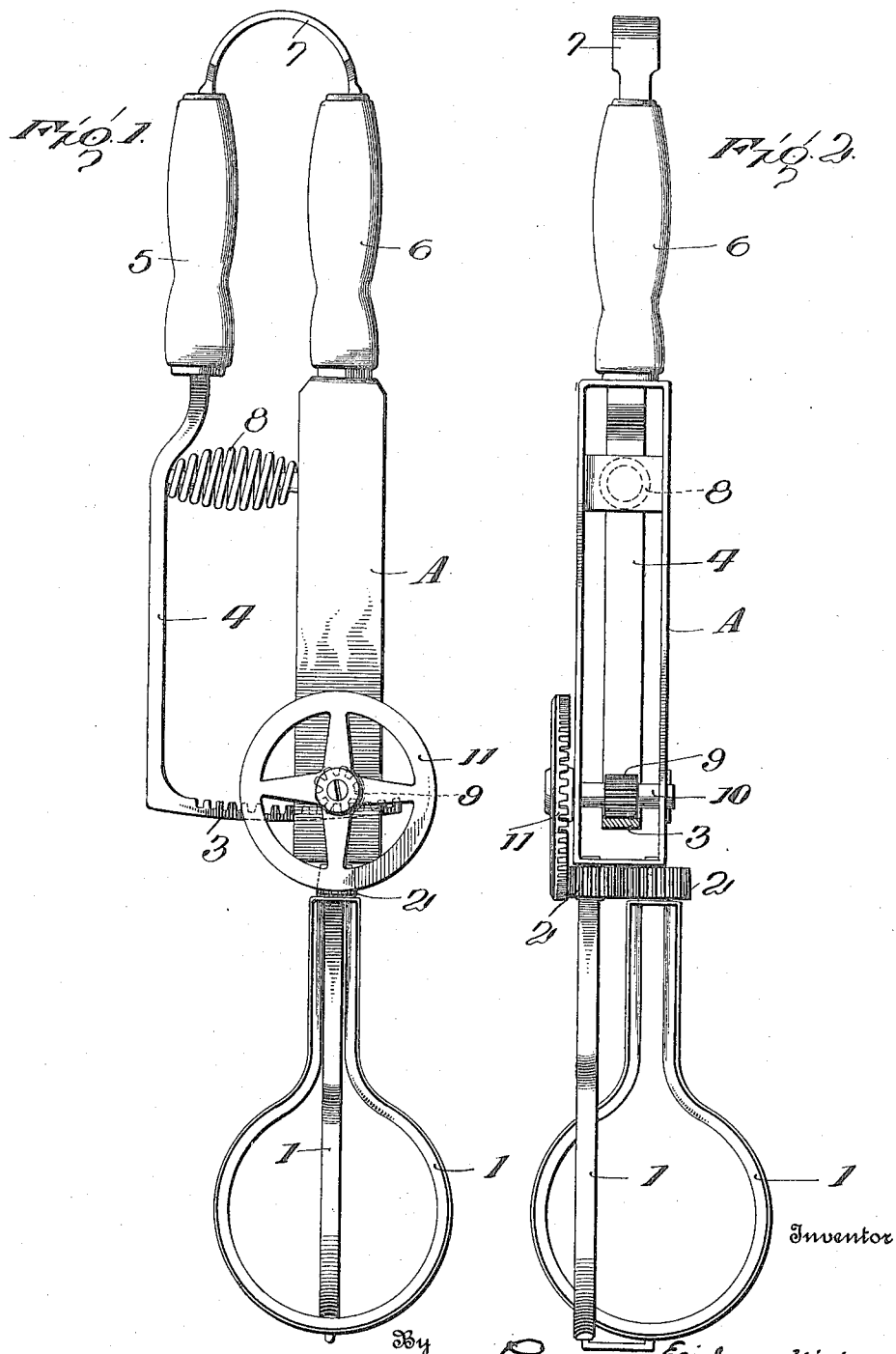

UNITED STATES PATENT OFFICE.

ESIDOROS YIAKAS, OF WHEELING, WEST VIRGINIA.

EGG-BEATER.

1,164,443.  Specification of Letters Patent.  Patented Dec. 14, 1915.

Application filed July 20, 1915. Serial No. 40,882.

*To all whom it may concern:*

Be it known that I, ESIDOROS YIAKAS, a subject of the King of Greece, residing at Wheeling, in the county of Ohio and State of West Virginia, have invented certain new and useful Improvements in Egg-Beaters, of which the following is a specification.

My invention relates to an improvement in egg-beaters, the fundamental idea being to provide one which can be manipulated conveniently and effectively with one hand, and it comprises a spring-actuated member which carried a toothed bar, which latter operates in conjunction with a toothed wheel as it reciprocates to actuate the beaters.

In the accompanying drawing: Figure 1 is a view in elevation; and Fig. 2 is a sectional view.

A, is the frame of the machine, and 1, 1, are the beaters, which are of the usual type and rotate in the frame and have intermeshed gears 2, 2, at their upper ends. These are driven by a toothed segment 3 which engages a gear 9 on shaft 10, and as it reciprocates or moves endwise the gear 9 is turned, and transmits its motion through a large gear 11 on shaft 10 to one of the gears 2. The segment is carried on the free end of an arm 4, which latter is provided with a handle 5, and is connected to the handle 6 by an inverted U-shaped spring 7, and is held away by an extension spring 8 passed between the frame A and arm 4, so that in actuating the beaters the operator merely grasps the two handles 5 and 6 in one hand, as shown, and squeezes them together toward each other, against the action of both springs 7 and 8, forcing the segment 3 to the right, thus rapidly turning the beaters 1, 1. Then upon releasing the grip, the springs 7 and 8 cause the arm with the toothed segment to move in the opposite direction, giving a reverse whirl to the beaters. In this way, I have devised an egg-beater of few and simple parts, easy to operate and effectual in the performance of its functions.

I claim:—

An egg-beater comprising a frame, beaters journaled side by side at one end thereof and provided with intermeshed gears, a shaft journaled transversely in the frame at right-angles to the axes of the beaters, said shaft carrying a crown-gear at one end, the teeth of which mesh with the teeth of the gear on one of the beaters for transmitting motion thereto, a spur-gear secured at or near the center of the shaft, an arm, a U-shaped spring connecting the arm with the frame, the frame and arm each having a handle thereon, and one end of the arm having a toothed segment which engages the spur-gear on the shaft for rotating the latter as the arm is vibrated, and a spring interposed between the frame and arm for normally throwing the arm outwardly in a direction away from the frame.

In testimony whereof I affix my signature.

ESIDOROS YIAKAS.

Copies of this patent may be obtained for five cents each, by addressing the "Commissioner of Patents Washington, D. C."